(12) United States Patent
Arakida et al.

(10) Patent No.: US 7,260,295 B2
(45) Date of Patent: Aug. 21, 2007

(54) OPTICAL WAVEGUIDE AND OPTICAL TRANSMITTING/RECEIVING MODULE

(75) Inventors: Takahiro Arakida, Kanagawa (JP); Kenji Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/541,088

(22) PCT Filed: Jan. 29, 2004

(86) PCT No.: PCT/JP2004/000799

§ 371 (c)(1),
(2), (4) Date: Jun. 29, 2005

(87) PCT Pub. No.: WO2004/068206

PCT Pub. Date: Aug. 12, 2004

(65) Prior Publication Data

US 2006/0093267 A1    May 4, 2006

(30) Foreign Application Priority Data

Jan. 30, 2003   (JP) .............................. 2003-021490

(51) Int. Cl.
G02B 6/26        (2006.01)
G02B 6/42        (2006.01)

(52) U.S. Cl. ............................ 385/45; 385/15; 385/31; 385/39; 385/42; 385/43

(58) Field of Classification Search ................. 385/45, 385/15, 31, 39, 42, 43
See application file for complete search history.

(56) References Cited

U.S. PATENT DOCUMENTS

| | | | | |
|---|---|---|---|---|
| 5,463,705 A | * | 10/1995 | Clauberg et al. | 385/14 |
| 6,157,760 A | * | 12/2000 | Fujita et al. | 385/49 |
| 2002/0154879 A1 | * | 10/2002 | Yasuda et al. | 385/132 |

FOREIGN PATENT DOCUMENTS

| | | |
|---|---|---|
| EP | 0338864 | 4/1989 |
| JP | 62-291604 | 12/1987 |
| JP | 01-273239 | 1/1989 |
| JP | 02-091831 | 3/1990 |
| JP | 11-183743 | 7/1999 |
| JP | 11-271548 | 10/1999 |
| JP | 2000-206349 | 7/2000 |
| JP | 2001-133642 | 5/2001 |
| JP | 2002-169043 | 6/2002 |
| JP | 2003-14964 | 1/2003 |

* cited by examiner

*Primary Examiner*—Frank G. Font
*Assistant Examiner*—Jerry Martin Blevins
(74) *Attorney, Agent, or Firm*—Robert J. Depke; Rockey, Depke & Lyons, LLC.

(57) ABSTRACT

An optical transmitting and receiving module for an optical waveguide performs both a transmitting operation and a receiving operation simultaneously. The linear first waveguide is provided such that one side is coupled to an optical fiber and the other side is coupled to a light receiving element. A second waveguide is coupled so as to meet and make an acute angle with the first waveguide. The second waveguide is shaped with a tapered portion adjacent to the first waveguide.

5 Claims, 3 Drawing Sheets

OPTICAL WAVEGUIDE AND OPTICAL TRANSMITTING/RECEIVING MODULE

This application claims priority to Japanese Patent Application Number JP2003-02 1490, filed Jan. 30, 2003 which is incorporated herein by reference.

TECHNICAL FIELD

The present invention relates to an optical waveguide and an optical transmitting and receiving module, particularly relates to an optical waveguide connecting an optical fiber and an optical element and an optical transmitting and receiving module being provided with the same.

BACKGROUND ART

In recent year, in order that an optical module used to an optical access system may make a size smaller and a cost reduce, an application of an optical transmitting and receiving module in which a transmitting operation and a receiving operation are performed together by using an optical waveguide etc. has been in main current. As the background of this, an expansion of a data transmission capacity has been demanded by supporting explosive popularization of the internet. The optical transmitting and receiving module is mounted with both a light emitting element for transmitting light and a light receiving element for receiving light.

In an optical transmitting and receiving module in related art, an optical signal transmitted from an optical fiber is divided by a Y-branching waveguide and transferred to the respective light receiving element and light emitting element (for example, refer to Japanese Unexamined Patent Publication (Kokai) No. 2000-206349 and No. 2002-169043).

Further, the optical transmitting and receiving module which the optical signal received from the optical fiber is transferred via a wavelength selection filter only to the light receiving element has been proposed (for example, refer to Japanese Unexamined Patent Publication (Kokai) No. 2001-133642).

In the optical transmitting and receiving module mentioned in the Japanese Unexamined Patent-Publication (Kokai) No. 2000-206349 and No. 2002-169043, by using the Y-branching waveguide, the optical signal transmitted from the optical fiber is guided to two-branched waveguides in a ratio of one to one respectively. Therefore, when the optical signal is received by the light receiving element, the optical signal is guided to the light emitting element simultaneously. Consequently the optical transmitting and receiving module is not able to transmit the optical signal simultaneously with receiving the optical signal.

The optical transmitting and receiving module mentioned in the Japanese Unexamined Patent Publication (Kokai) No. 2001-133642) can perform simultaneously a transmitting operation and a receiving operation, however the module has to be mounted with a wavelength selection filter or other optical element, so that it has a disadvantage in terms of a cost and productivity.

DISCLOSURE OF THE INVENTION

The present invention has as its object to provide an optical waveguide able to perform simultaneously a transmitting operation and a receiving operation free from other optical element, and an optical transmitting and receiving module for the same.

To attain the above object, the optical waveguide of the present invention has: a first waveguide having a common transmitting and receiving port at one side and a receiving port at the other side, extending linearly, and able to guide an optical signal in bi-direction; and a second waveguide branching off from the first waveguide so as to make an acute angle with the receiving port, coupling to the first waveguide at one side, having a transmitting port at the other side, and guiding an optical signal to the first waveguide.

According to the optical waveguide of the present invention, the incidence optical signal from the common transmitting and receiving port is guided by the first waveguide to reach the receiving port. The first waveguide is extended linearly, so that the first waveguide almost guides the incidence optical signal from the common transmitting and receiving port to the receiving port, and does not guide it to the second waveguide. Therefore, while the common transmitting and receiving port performs an incidence of the optical signal, the transmitting port of the second waveguide can perform the incidence of the optical signal.

The incidence light from the transmitting port of the second waveguide is guided toward the first waveguide, coupled to the first waveguide, and guided to the common transmitting and receiving port. The second waveguide is branched off from the first wave guide so as to make an acute angle with the receiving port, so that the light is not guided to the receiving port side and the optical signal guided from the second waveguide is guided to the common transmitting and receiving port of the first waveguide.

To attain the above object, the optical transmitting and receiving module of the present invention in which a optical fiber, a light emitting element and a light receiving element are coupled via an optical waveguide has: a first waveguide coupling to the optical fiber at one side and a light receiving element at the other side and extending linearly; and a second waveguide branching off from the first waveguide so as to make an acute angle with the other side of the first waveguide and coupling the first waveguide at one side and a light emitting element at the other side.

According to the optical transmitting and receiving module of the present invention, when the optical fiber performs the incidence of the optical signal in the first waveguide, the optical signal is guided by the first waveguide and received by the light receiving element. The first waveguide is extended linearly, so that the incidence light from the optical fiber is almost received by the light receiving element and is not guided to the second waveguide. Therefore, while the optical fiber performs the incidence of the optical signal, the light emitting element can perform the incidence of the optical signal to the second waveguide.

When the light emitting element performs the incidence of the optical signal in the second waveguide, the optical signal is guided toward the first waveguide by the second waveguide, coupled to the first waveguide and guided toward the optical fiber.

The second waveguide is branched off so as to make an acute angle with the other side of the first waveguide, so that the optical signal is not guided to the receiving port which is coupled to the other side of the first waveguide and the optical signal guided by the second waveguide is almost guided to the optical fiber side of the first waveguide.

BEST MODE FOR CARRYING OUT THE INVENTION

Hereinafter, embodiments of an optical waveguide and an optical transmitting and receiving module according to the present invention will be described with reference to the drawings.

Figure 1:
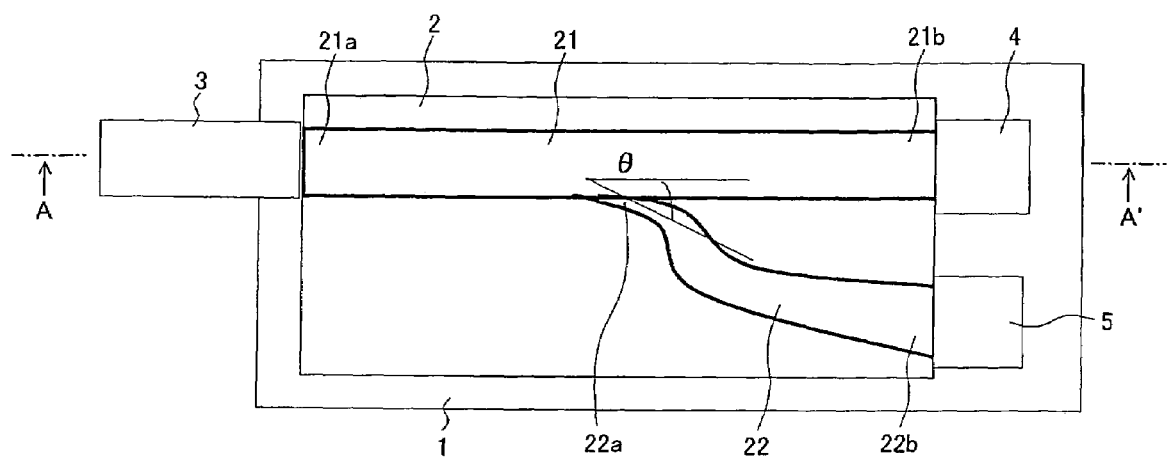
FIG. 1 is a plane view of an example of a configuration of an optical transmitting and receiving module having an optical waveguide according to the present embodiment.
Figure 2:
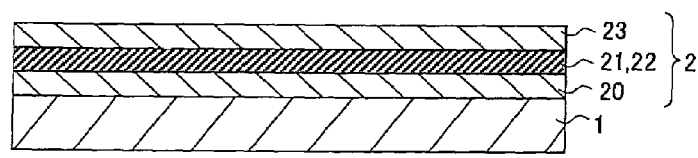
FIG. 2 is a cross-sectional view along a line A-A' of the optical waveguide in FIG. 1.

FIG. 1 is a plane view of an example of a configuration of an optical transmitting and receiving module having an optical waveguide according to the present embodiment. And FIG. 2 is a cross-sectional view along a line A-A' of the optical waveguide shown in FIG. 1.

The optical transmitting and receiving module shown in FIG. 1 has an optical waveguide 2 formed on a substrate 1 of a silicon substrate or sapphire substrate, an optical fiber 3, a light receiving element 4 and a light emitting element 5 which are mounted on the substrate 1.

The optical waveguide 2 has a first waveguide core portion (a first waveguide) 21 extended linearly and a second waveguide core portion (a second waveguide) 22 that one side is coupled so as to make an angle θ with the first waveguide core portion 21. As shown in the cross-sectional view of FIG. 2, the respective waveguide core portions 21 and 22 are formed on a cladding portion 20 which is formed on the substrate 1. Further, a cladding portion 23 is formed so as to cover the respective waveguide core portions 21 and 22.

The first waveguide core portion 21 has a common transmitting and receiving port 21a at one side and a receiving port 21b at the other side, and guides the optical signal in bi-direction. The first waveguide core portion 21 is preferably a multimode waveguide and formed with a diameter of 50 μm, for example. In other words, in order to couple the optical signal in low-loss guided from the second waveguide core portion 22 which is branched off obliquely to guide it to the common transmitting and receiving port 21a, it is preferably that the first waveguide core portion 21 is a multimode waveguide having a large diameter and an incidence of light in easily. The multimode waveguide is defined as a waveguide having a dimension able to guide a plurality of modes of the optical signal (passing ways of light).

The second waveguide core portion 22 is formed with a branching portion 22a by coupling one side so as to make the angle θ with the first waveguide core portion 21 of the receiving port 21b side, and with a transmitting port 22b at the other side. The angle and dimensions of the second waveguide core portion 22 which is branched off from the first waveguide core portion 21 obliquely are defined at an angle and dimension such that the optical signal guided from the optical fiber 3 is not guided to the second waveguide core portion 22.

As a condition for this, the angle θ has to be an acute angle, which is preferably 5° to 60°. By defining the angle in this way, almost the optical signal guided from the common transmitting and receiving port 21a of the first waveguide core portion 21 is guided passing through the linearly first waveguide core portion 21 to the receiving port 21b. Further, the optical signal guided from the transmitting port 22b is coupled to the first waveguide core 21 in low-losses and guided to the common transmitting and receiving port 21a.

A dimension of the branching portion 22a of the second waveguide core portion 22, namely a wide or thickness of the waveguide, is preferably smaller than the first waveguide core portion 21 with a linearly shape. By making a width or thickness of the waveguide at the branching portion 22a smaller, it can prevent that the light signal guided from the common transmitting and receiving port 21a of the first waveguide core portion 21 is guided to the second waveguide core portion 22.

In an example shown in FIG. 1, the first waveguide core portion 21 and the second waveguide core portion 22 are coupled so as to suppress a scatter of light, so that the second waveguide core portion 22 has a gentle curved shape.

The respective waveguide core portions 21 and 22 are formed by material which does not have absorption with respect to the used light and have a higher refractive index with respect to the used light than the cladding portions 20 and 23. The waveguide core portions 21 and 22 are formed by epoxy resin, fluorinated polyimide or other polymer materials, for example, and the material is added with an impurity to adjust the refractive index.

The cladding portions 20 and 23 are formed by material which does not have absorption with respect to the used light and have a lower refractive index with respect to the used light than the waveguide core portions 21 and 22. The cladding portions 20 and 23 are formed by epoxy resin, fluorinated polyimide or other polymer materials, for example, and the materials is added with an impurity to adjust the refractive index. Note that, the cladding portions 20 and 23 and the waveguide core portions 21 and 22 may be formed by same materials or different materials.

The optical fiber 3 is optically coupled at its one side to the common transmitting and receiving port 21a of the first waveguide core portion 21 and mounted on the substrate 1. The optical fiber 3 may be a multimode fiber or a single mode fiber.

The light receiving element 4 is optically coupled at its receiving surface to the receiving port 21b of the first waveguide core portion 21 and mounted on the substrate 1. The light receiving element 4 may be a photo diode, for example.

The light emitting element 5 is optically coupled at its emitting surface to the transmitting port 22b of the second waveguide core portion 22 and mounted on the substrate 1. The light emitting element 5 can be used with a semiconductor laser such as a fabry perot laser (FP-LD) and a distributed feedback laser (DFB-LD) etc.

Next, an operation of the optical transmitting and receiving module according to the present embodiment will be described with reference to FIG. 1.

A receiving optical signal which is incidence of light from the optical fiber 3 is guided from the common transmitting and receiving port 21a to the receiving port 21b by the first waveguide core portion 21, and received by the light receiving element 4. The optical signal is converted by the light receiving element 4 to an electric signal, and input to a not shown receiving circuit which is connected to the light receiving element 4. In the above receiving operation, the receiving optical signal which is guided by the first waveguide core portion 21 is not guided to the second waveguide core portion 22 and the light emitting element 5, so that the light emitting element 5 can transmit a transmitting optical signal at the same time.

Namely, in the receiving operation, the transmitting optical signal emitted by the light emitting element 5 is guided from the transmitting port 22b to the branching portion 22a by the second waveguide core portion 22, coupled to the first waveguide core portion 21, guided to the common transmitting and receiving port 21a by the first waveguide core portion 21, and coupled to the optical fiber 3. The second waveguide portion 22 branches off from the first waveguide core portion 21 so as to make an acute angle θ with the receiving port 21b, so that the transmitting optical signal is not guided to the light receiving element 4 side and does not affect the receiving operation by the light receiving element 4.

The transmitting optical signal coupled to the optical fiber 3 is guided by the optical fiber 3 and transferred to the outside of the optoelectronic circuit device. Note that, wavelengths of the receiving optical signal and the transmitting optical signal can be changed.

Next, an example of a method for producing the optical transmitting and receiving module according to the present embodiment will be described with reference to FIGS. 1 and 2.

First, epoxy resin, fluorinated polyimide or other polymer material is coated on the entire surface of the substrate 1 to form the cladding portion 20. Further, epoxy resin, fluorinated polyimide or other polymer material is coated on the entire surface thereof to form a high refractive index layer to be the core portion. The difference of the refractive index of the cladding portion 20 and the high refractive index layer is adjusted by adding an impurity.

Then, the high refractive index layer is formed on its surface with a resist having the predetermined pattern by photolithography, and performed with a reactive ion etching by using the resist as a mask to form the first waveguide core portion 21 and the second waveguide core portion 22 having shapes shown in FIG. 1.

The resist is removed, and then epoxy resin, fluorinated polyimide or other polymer material is coated on the entire surface thereof so as to cover the waveguide core portions 21 and 22 to form the cladding portion 23. As a result, the optical waveguide 2 which has the waveguide core portions 21 and 22 embedded in the cladding portions 20 and 23 is formed on the substrate 1 as shown in FIG. 2.

Then, the optical fiber 3 is mounted on the substrate 1 so as to couple one side of the optical fiber 3 with the common transmitting and receiving port 21a of the first waveguide core portion 21 optically.

Further, the light receiving element 4 is mounted on the substrate 1 so as to couple the receiving surface of the light receiving element 4 with the receiving port 21b of the first waveguide core portion 21 optically. Furthermore, the light emitting element 5 is mounted on the substrate 1 so as to couple the emitting surface of the light emitting element 5 with the transmitting port 22b of the second waveguide core portion 22 optically.

Next, effects of the optical waveguide and the optical transmitting and receiving module according to the present embodiment will be described.

Figure 3A:
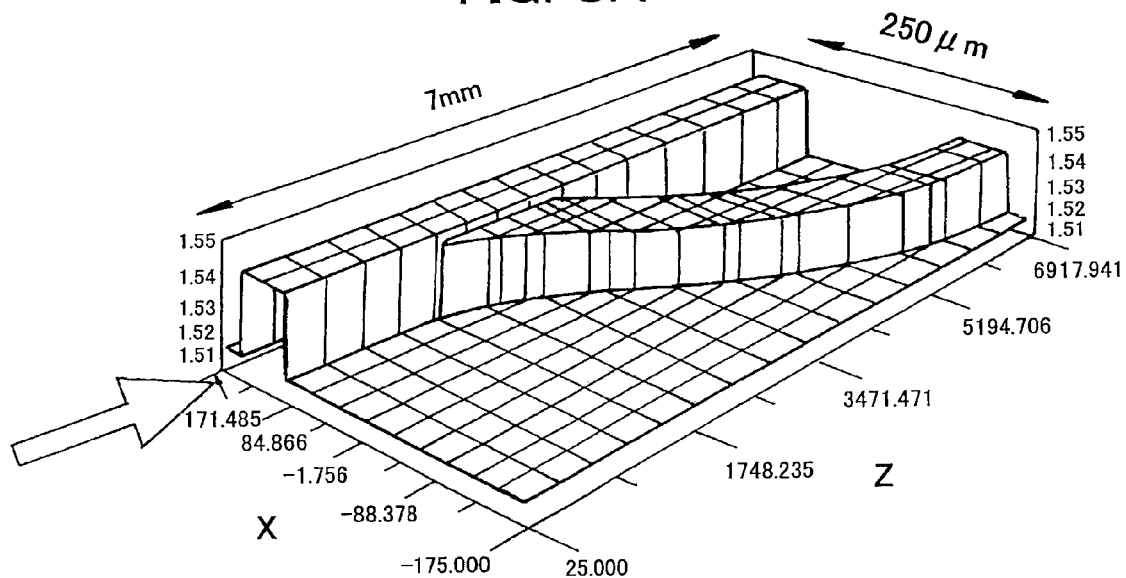
FIG. 3A is a view of a waveguide shape and FIG. 3B is a view of a simulation result of an intensity pattern of guided light in a receiving operation by the optical waveguide shown in FIG. 3A.
Figure 3B:
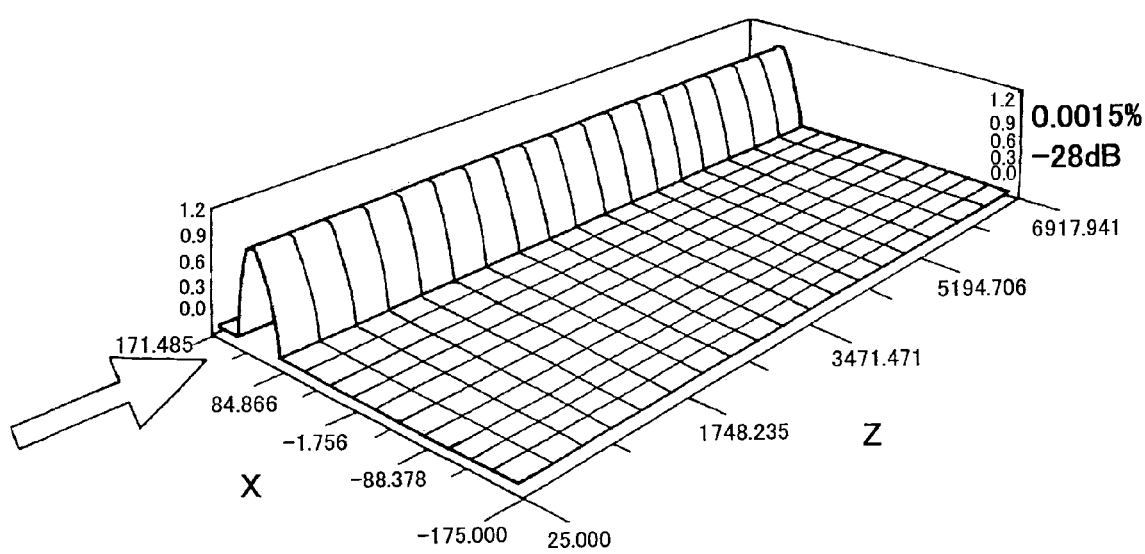

FIG. 3A is a view of a waveguide shape and FIG. 3B is a view of a simulation result of an intensity pattern of guided light in the receiving operation by the optical waveguide shown in FIG. 3A. As shown in FIG. 3A, it is simulated about the optical waveguide that a length of the first waveguide core portion 21 with linearly shape is 7 mm and an interval between the receiving port 21b of the first waveguide core portion 21 and the transmitting port 22b of the second waveguide core portion 22 is 250 μm. The respective waveguide core portions 21 and 22 are assumed as 50 μm square and the difference with respect to the refractive index of the cladding portion is assumed as 1.5%. Note that, the X-coordinate and Z-coordinate indicate a position coordinate in which a shape of the optical waveguide is divided by a μm unit.

As shown in FIG. 3B, in the receiving operation, the receiving optical signal of 97.6% is guided to the receiving port 21b of the first waveguide core portion 21 and the receiving optical signal of 0.0015% is guided to the transmitting port 22b of the second waveguide core portion 22. So the receiving optical signal almost goes straight in the first waveguide core portion 21 with the linearly shape. Therefore, the receiving optical signal which is incident of light to the first waveguide core portion 21 is guided to the receiving port 21b at low-loss of 0.10 dB which is not more than 1.0 dB. Note that, an intensity of the optical signal which is guided to the second waveguide core portion 22 is −28 dB, so that the optical signal is rarely guided.

Figure 4A:
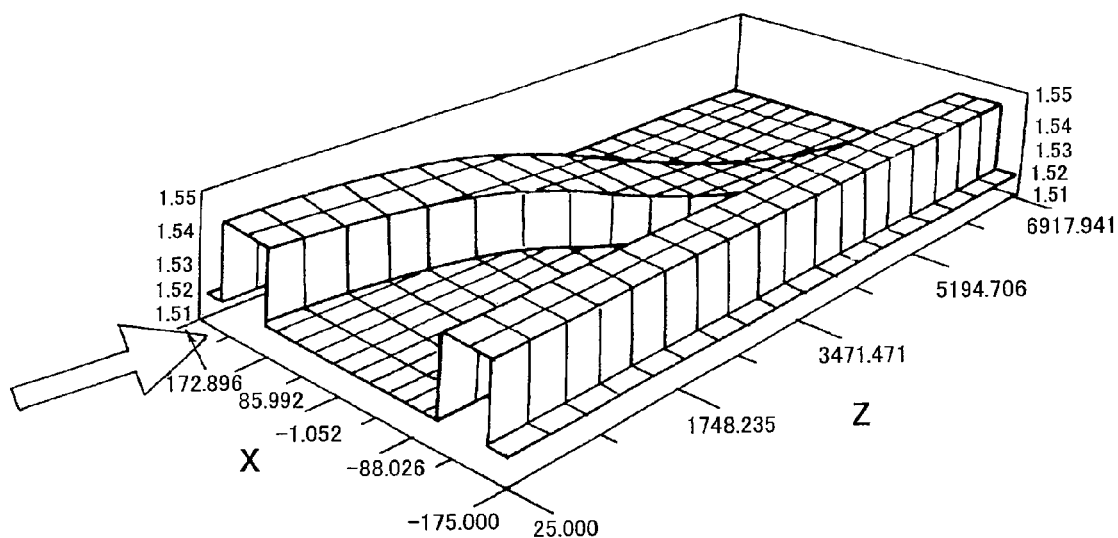
FIG. 4A is a view of a waveguide shape and FIG. 4B is a view of a simulation result of an intensity pattern of guided light in a transmitting operation by the optical waveguide shown in FIG. 4A.
Figure 4B:
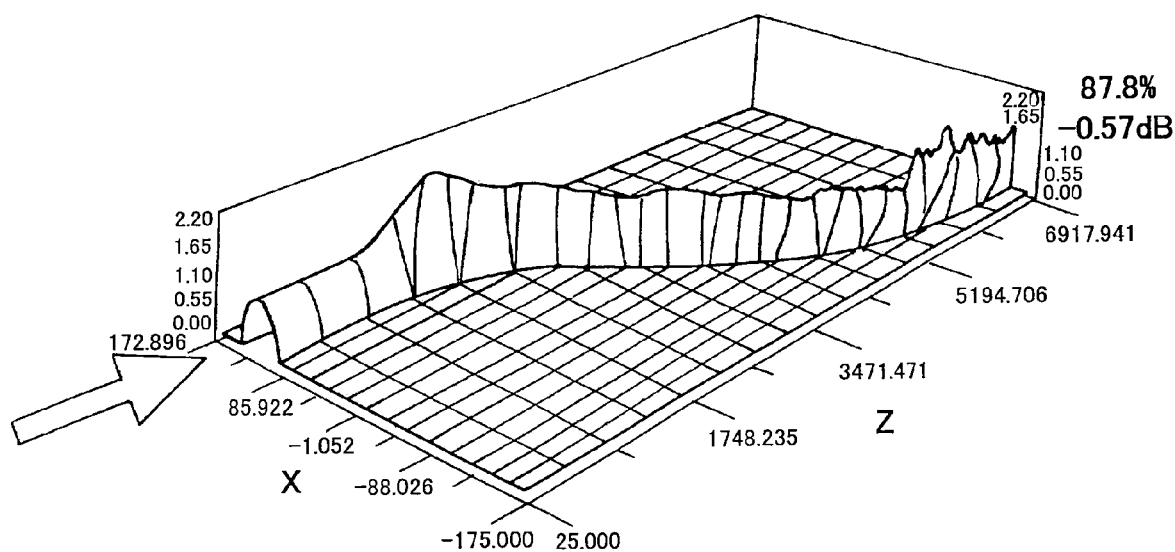

FIG. 4A is a view of a waveguide shape and FIG. 4B is a view of a simulation result of an intensity pattern of guided light in the transmitting operation by the optical waveguide shown in FIG. 4A. The optical waveguide shown in FIG. 4A is a same as FIG. 3A. Note that, in the FIGS. 4A and 4B, the X-coordinate and Z-coordinate indicate a position coordinate in which a shape of the optical waveguide is divided by a μm unit.

As shown in FIG. 4B, in the transmitting operation, the transmitting optical signal of 87.8% from the second waveguide core portion 22 is coupled to the first waveguide core portion 21 and guided to the common transmitting and receiving port 21a. Therefore, the transmitting optical signal from the second waveguide core portion 22 is guided to the first waveguide core portion 21 at 0.57 dB in low-loss which is not more than 1.0 dB.

As mentioned above, by the optical waveguide and the optical transmitting and receiving module according to the present embodiment, it can be realized that a transmitting operation and a receiving operation is performed simultaneously in bi-direction by using a single optical fiber free from a wavelength selection filter or other optical element.

Further, the respective waveguide core portions 21 and 22 of the optical waveguide can be formed together by patterning etc. as mentioned above and a recess for inserting a wavelength selection filter or other optical element is not needed, so that the optical waveguide in low-loss can be produced in high yield. Namely, if a wavelength selection filter or other optical element is mounted, it may cause a deterioration of a characteristic such as a light scattering loss and reliability of the coupling strength.

The present invention is not limited to the above embodiment.

For example, materials for the substrate 1, the cladding portions 20 and 23 and the waveguide core potions 21 and 22 which are included in the optical waveguide are not limited and the material for the optical fiber 3 is not also limited.

Other than the above, a variety of modification may be made within the scope of the present invention.

INDUSTRIAL APPLICABILITY

The optical waveguide and the optical transmitting and receiving module in the present invention can be applied to an optical access system, for example.

The invention claimed is:

1. An optical waveguide comprising:
   a first waveguide having a common transmitting and receiving port at one side and a receiving port at the other side, extending linearly, and able to guide an optical signal in bi-direction, and
   a second waveguide branching off from said first waveguide so as to make an acute angle with said receiving port, coupling said first waveguide at one side, having a transmitting port at the other side, and guiding an optical signal to said first waveguide, wherein said second waveguide is formed with a dimension such that said one side which is coupled to said first waveguide is smaller than the other side.

2. An optical waveguide as set forth in claim 1, wherein said first waveguide is formed with a dimension able to guide a plurality of modes of the optical signal.

3. An optical transmitting and receiving module coupled with an optical fiber, a light emitting element and a light receiving element via an optical waveguide comprising:
   a first waveguide coupling said optical fiber at one side and said light receiving element at the other side and extending linearly, and a second waveguide branching off from said first waveguide so as to make an acute angle with said other side of said first waveguide and coupling said first waveguide at one side and said light emitting element at the other sides, wherein said second waveguide is formed with a dimension such that said one side which is coupled to said first waveguide is smaller than the other side.

4. An optical transmitting and receiving module as set forth in claim 3, wherein said first waveguide is formed with a dimension able to guide a plurality of modes of said optical signal.

5. An optical waveguide comprising:
   a first waveguide baying a common transmitting and receiving port at one side and a receiving port at the other side, extending linearly, and able to guide an optical signal in bi-direction, and
   a second waveguide branching off from said first waveguide so as to make an acute angle with said receiving port, coupling said first waveguide at one side, having a transmitting port at the other side, and guiding an optical signal to said first waveguide, wherein said second waveguide is formed with a dimension such that said one side which is coupled to said first waveguide is smaller than the other side and the second waveguide is curved at a portion adjacent the first waveguide.

* * * * *